(12) United States Patent
Shukla et al.

(10) Patent No.: US 9,852,133 B2
(45) Date of Patent: *Dec. 26, 2017

(54) SCALABLE, SCHEMALESS DOCUMENT QUERY MODEL

(71) Applicant: Microsoft Technology Licensing, LLC, Redmond, WA (US)

(72) Inventors: Dharma Shukla, Bellevue, WA (US); Madhan Gajendran, Bellevue, WA (US); Quetzalcoatl Bradley, Monroe, WA (US); Shireesh Kumar Thota, Issaquah, WA (US); Li Zhang, Sunnyvale, CA (US); Mihai Dan Budiu, Sunnyvale, CA (US); Yuan Yu, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/986,997

(22) Filed: Jan. 4, 2016

(65) Prior Publication Data
US 2016/0117320 A1   Apr. 28, 2016

Related U.S. Application Data

(63) Continuation of application No. 13/828,229, filed on Mar. 14, 2013, now Pat. No. 9,230,040.

(51) Int. Cl.
*G06F 7/00* (2006.01)
*G06F 17/30* (2006.01)

(52) U.S. Cl.
CPC .. *G06F 17/30011* (2013.01); *G06F 17/30321* (2013.01); *G06F 17/30486* (2013.01); *G06F 17/30554* (2013.01); *G06F 17/30964* (2013.01)

(58) Field of Classification Search
CPC ......... G06F 17/30929; G06F 17/30675; G06F 17/30654; G06F 17/30696; G06F 17/30923; G06F 17/30941
(Continued)

(56) References Cited

U.S. PATENT DOCUMENTS 6,279,007 B1 *  8/2001  Uppala ............. G06F 17/30961
7,552,119 B2 *  6/2009  Ting ................. G06F 17/30938
(Continued)

OTHER PUBLICATIONS

First Action Office Action cited in U.S. Appl. No. 13/828,229 dated Mar. 12, 2015, 2 pgs.
(Continued)

*Primary Examiner* — Binh V Ho
(74) *Attorney, Agent, or Firm* — Cooper Legal Group, LLC

(57) ABSTRACT

Query models for document sets (such as XML documents or records in a relational database) typically involve a schema defining the structure of the documents. However, rigidly defined schemas often raise difficulties with document validation with even inconsequential structural variations. Additionally, queries developed against schema-constrained documents are often sensitive to structural details and variations that are not inconsequential to the query, resulting in inaccurate results and development complications, and that may break upon schema changes. Instead, query models for hierarchically structured documents that enable "twig" queries specifying only the structural details of document nodes that are relevant to the query (e.g., students in a student database having a sibling named "Lee" and a teacher named "Smith," irrespective of unrelated structural details of the document). Such "twig" query models may enable a more natural query development, and continued accuracy of queries in the event of unrelated schema variations and changes.

20 Claims, 8 Drawing Sheets

(58) Field of Classification Search
USPC .......................................................... 707/722
See application file for complete search history.

(56) References Cited

U.S. PATENT DOCUMENTS

| | | | |
|---|---|---|---|
| 8,205,090 B2 | 6/2012 | Oom Temudo de Castro et al. | |
| 2004/0201449 A1 | 10/2004 | Denison et al. | |
| 2006/0047646 A1 | 3/2006 | Maluf et al. | |
| 2006/0112148 A1* | 5/2006 | Jennings, III | G06F 17/30109 |
| 2008/0183657 A1* | 7/2008 | Chang | G06F 17/30923 |
| 2008/0222176 A1* | 9/2008 | Cai | G06F 17/30938 |
| 2008/0263008 A1* | 10/2008 | Beyer | G06F 17/30935 |
| 2009/0138429 A1* | 5/2009 | Chowdhury | G06F 17/30923 |
| 2009/0157701 A1* | 6/2009 | Lahiri | G06F 17/30327 |
| 2010/0169354 A1* | 7/2010 | Baby | G06F 17/30911 707/765 |
| 2010/0211572 A1* | 8/2010 | Beyer | G06F 17/30864 707/742 |
| 2011/0047143 A1* | 2/2011 | Hammerschmidt | G06F 17/30935 707/716 |
| 2011/0191325 A1* | 8/2011 | Dexter | G06F 17/30675 707/722 |
| 2011/0302189 A1* | 12/2011 | Liu | G06F 17/30929 707/769 |
| 2011/0302198 A1* | 12/2011 | Baby | G06F 17/30539 707/769 |
| 2012/0221604 A1* | 8/2012 | Gao | G06F 17/30938 707/797 |
| 2012/0246613 A1 | 9/2012 | Shukla et al. | |
| 2012/0260227 A1 | 10/2012 | Shukla et al. | |
| 2012/0330954 A1 | 12/2012 | Sivasubramanian et al. | |

OTHER PUBLICATIONS

Reply First Action Office Action cited in U.S. Appl. No. 13/828,229 dated May 12, 2015, 14 pgs.
Notice of Allowance cited in U.S. Appl. No. 13/828,229 dated Aug. 28, 2015, 8 pgs.
"Highly Scalable Distributed Component Framework for Scientific Computing", Kostadin Damevski, Ashwin Deepak Swaminathan and Steven Parker, Sep. 26, 2007, in the 3rd International conference on High Performance Computing and Communication, reprinted from the Internet at: http://damevski.github.io/files/ccaloop.pdf, 12 pgs.
"The Model for Distributed Systems (Windows)", Feb. 14, 2013, reprinted from the Internet at: https://msdn.microsoft.com/en-us/library/windows/desktop/aa378717(v=vs.85).aspx, 2 pgs.
"Flume User Guide", Oct. 5, 2012, reprinted from the Internet at: http://archive.cloudera.com/cdh/3/flume/UserGuide, 88 pgs.
"Couchbase Server Architecture", 2013, reprinted from the Internet at: http://www.couchbase.com/nosql-databases/couchbase-server, 6 pgs.
"20 Putting into Practice: COUCHDB, a JSON Semi-Structured Database", Feb. 14, 2013, reprinted from the Internet at: http://webdam.inria.fr/Jorge/html/wdmch21.html, 16 pgs.

* cited by examiner

200

202 — RELATIONAL DATABASE
204 — RELATIONAL DATABASE SCHEMA

206 — TABLE: STUDENTS

| FIELD | TYPE |
|---|---|
| ID | INT |
| FIRSTNAME | STRING |
| LASTNAME | STRING |

206 — TABLE: RELATIVES

| FIELD | TYPE |
|---|---|
| STUDENT | INT |
| FIRSTNAME | STRING |
| LASTNAME | STRING |
| RELATION | STRING |

206 — TABLE: TEACHERS

| FIELD | TYPE |
|---|---|
| ID | INT |
| FNAME | STRING |
| LNAME | STRING |

206 — TABLE: CLASSES

| FIELD | TYPE |
|---|---|
| ID | INT |
| NAME | STRING |
| TEACHER | INT |

206 — TABLE: ENROLLMENT

| FIELD | TYPE |
|---|---|
| STUDENT | INT |
| CLASS | INT |

208 — TABLE: STUDENTS

| ID | FIRSTNAME | LASTNAME |
|---|---|---|
| 001 | Joe | Cooper |
| 002 | Mark | Fisher |
| 003 | Amanda | Green |

210 — ID ... 212 —

208 — TABLE: RELATIVES

| STUDENT | FIRSTNAME | LASTNAME | RELATION |
|---|---|---|---|
| 001 | Ann | Cooper | mother |
| 001 | Joe | Cooper | father |
| 001 | Lee | Cooper | sibling |
| 002 | Linda | Fisher | mother |
| 002 | David | Fisher | brother |
| 003 | Renee | Green | mother |
| 003 | Jack | Lee | father |
| 003 | David | Green | sibling |

208 — TABLE: TEACHERS

| ID | FNAME | LNAME |
|---|---|---|
| 001 | Joe | Lee |
| 002 | Sue | Jones |
| 003 | Jill | Scott |
| 004 | Scott | Irish |

208 — TABLE: CLASSES

| ID | NAME | TEACHER |
|---|---|---|
| 001 | History | 001 |
| 002 | Math | 002 |
| 003 | Art | 003 |
| 004 | Science | 001 |
| 005 | Music | 004 |

208 — TABLE: ENROLLMENT

| STUDENT | CLASS |
|---|---|
| 001 | 001 |
| 001 | 002 |
| 002 | 003 |
| 002 | 004 |
| 003 | 001 |
| 003 | 004 |

214 — RELATIONAL QUERY

SELECT FIRSTNAME, LASTNAME FROM STUDENTS WHERE ID IN
(SELECT STUDENT FROM ENROLLMENT, CLASSES, TEACHERS WHERE
TEACHERS.LNAME = 'Irish' AND CLASSES.TEACHER = TEACHERS.ID
AND ENROLLMENT.CLASS = STUDENTS.ID);

FIG. 2

```
106 ─┐                    DOCUMENT 1
     {
       firstname: 'Joe', lastname: 'Cooper',
       family: [
         { relation: 'mother', firstname: 'Ann', lastname: 'Cooper'}
       ], classes: [
         { name: 'History', teacher: { fname: 'Joe', lname: 'Lee' } }
       ]
     }

106 ─┐                    DOCUMENT 2
     {
       firstname: 'Mark', lastname: 'Fisher',
       family: [
         { relation: 'mother', firstname: 'Linda', lastname: 'Fisher'}
       ], classes: [
         { name: 'Art', teacher: { firstname: 'Jill', lastname: 'Scott' } }
       ]
     }
```

702 —

| 304 — REVERSE INDEX | 106 — |
|---|---|
| QUERY NODE PATH | DOCUMENTS |
| /firstname | 1, 2 |
| /firstname: 'Joe' | 1 |
| /firstname: 'Mark' | 2 |
| /family | 1, 2 |
| /family/relation | 1, 2 |
| /family/relation: 'mother' | 1, 2 |
| /family/relation: 'mother', firstname | 1, 2 |
| /family/relation: 'mother', firstname: 'Ann' | 1 |
| /family/relation: 'mother', firstname: 'Linda' | 2 |
| /family/relation: 'mother', lastname | 1, 2 |
| /family/relation: 'mother', lastname: 'Ann' | 1 |
| /family/relation: 'mother', lastname: 'Linda' | 2 |
| /classes | 1, 2 |
| /classes/name | 1, 2 |
| /classes/name: 'History' | 1 |
| /classes/name: 'Art' | 2 |
| /classes/teacher | 1, 2 |
| /classes/teacher/fname | 1, 2 |
| /classes/teacher/fname: 'Joe' | 1 |
| /classes/teacher/fname: 'Jill' | 2 |
| /classes/teacher/lname | 1, 2 |
| /classes/teacher/lname: 'Lee' | 1 |
| /classes/teacher/lname: 'Scott' | 2 |

SCALABLE, SCHEMALESS DOCUMENT QUERY MODEL

CROSS-REFERENCE TO RELATED APPLICATIONS

This application is a continuation of, and claims priority to U.S. patent application Ser. No. 13/828,229, entitled "SCALELESS, SCHEMALESS DOCUMENT QUERY MODEL," filed on Mar. 14, 2013, the entirety of which is hereby incorporated by reference in its entirety as if fully rewritten herein.

BACKGROUND

Within the field of computing, many scenarios involve the storage of a document set comprising one or more documents, such as records in one or more relational tables of a relational database or a set of extensible markup language (XML) or JavaScript Object Notation (JSON) documents, wherein respective documents comprise a set of fields having field names and one or more field values. In many such scenarios, the documents are stored in a structured manner, such as according to a relational schema of a database or a logical schema specified by an XML schema. Often, the schema is enforced to ensure that the documents of the document set comply with the schema.

In such scenarios, a query may be provided by an application or a user as a request to identify the documents of the document set satisfying the criteria of the query. For document sets that are constrained by a defined structure, the query may specify a selection of documents according to various details of the structure (e.g., for database records in a relational database, the query may specify a request for the selection of records from a particular table having fields with values matching a particular query criterion, and may identify the fields according to the names identified in the relational schema). For document sets that are not constrained by a defined structure, the query may specify more general queries, such as generalized text matching against the textual contents of the documents.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Constraining a document set according to a schema may have some advantages, but may also present some disadvantages. As a first example, schema-constrained documents sets are sensitive to inconsistencies among documents, including inconsistencies that may be inconsequential, and it may be undesirable either to reject documents that do not satisfy the schema or to alter the document to match the schema in ways that distort the contents of the document. As a second example, complexities and nuances in the schema may complicate the development of queries, which may return inaccurate results and/or involve a trial-and-error process to achieve desired results. As a third example, significant difficulties may arise if the schema changes; e.g., documents that validated against a first schema may not validate against the second schema, resulting in a complicated and possibly inaccurate data migration, and queries correctly specified according to the first schema may return inaccurate results after migrating the documents to the second schema.

On the other hand, storing schemaless documents in an unconstrained manner may result in an inadequately sophisticated query model. For example, the documents of the document set may present some organizational similarities representing structure or relationships, such as a hierarchical data set specified in a hierarchical language such as XML or JSON. However, the query model may lack the capacity to query the document set in this manner. Instead, the user may have to use more primitive querying logic to identify the matching the query, such as "text scraping" and regular expressions that may be sensitive to inconsequential variations in the contents of the documents.

Presented herein are techniques for enabling a querying of documents according to a structure of the documents, but not constrained to a defined schema. In accordance with these techniques, respective documents may be interpreted according to a hierarchical or tree structure, comprising a root node and a set of nodes respectively comprising a node name, a node path from the root node, and, optionally, a node value. A document service may receive, evaluate, and optionally index the documents according to the hierarchical structures. Upon receiving a query specifying one or more query node identifiers, the document service may identify the documents having at least one matching node having a node path that matches each query node identifier. This query model, involving "twig" queries, does not specify a set of constraints to be rigidly applied in view of a schema, but rather involves queries that more generally describe some properties of nodes in matching documents that are to be provided as query results.

For example, a document set for a school may comprise a set of documents for respective students, where each document specifies the student's name, family members, interests, and the classes and grades comprising the student's academic record. A query may request the identification of documents wherein the student has a sibling named "Lee" and has previously been enrolled with a teacher having a last name of "Smith." Even if the internal organization of the documents representing respective students may be specified in various ways, any document having a node value of "Lee" in a "sibling" node portion of the document and a node value of "Smith" in a "teacher" node portion of the document is presumed to match the query and is returned as a query result. By interpreting the query as a set of descriptors of matching nodes instead of a rigid set of criteria formulated according to a schema, the query model enables the development of queries that specify relevant details of the structure of the documents in a more natural and relaxed manner. Additionally, the evaluation of such queries in a manner that is less susceptible to inconsequential variations in the schema, and even if the schema changes in ways that are unrelated to the semantics of the query. This query evaluation also enables query operators generally based on the structure of the documents, such as a "cut" operator involving the application of a remainder of the query to a subset of nodes descending from a matching node. These and other features of the query model may enable the development of queries specifying relevant structural details of matching documents, in the absence of an overly rigid schema, in accordance with the techniques presented herein.

To the accomplishment of the foregoing and related ends, the following description and annexed drawings set forth certain illustrative aspects and implementations. These are indicative of but a few of the various ways in which one or

DESCRIPTION OF THE DRAWINGS

FIG. 2 is an illustration of an exemplary scenario featuring the representation of the exemplary document set of FIG. 1 as a relational database constrained by a relational database schema and a relational query applied thereto.

FIG. 7 is an illustration of an exemplary scenario featuring a reverse index provided to indicate the documents comprising respective query node paths.

DETAILED DESCRIPTION

Figure 1:
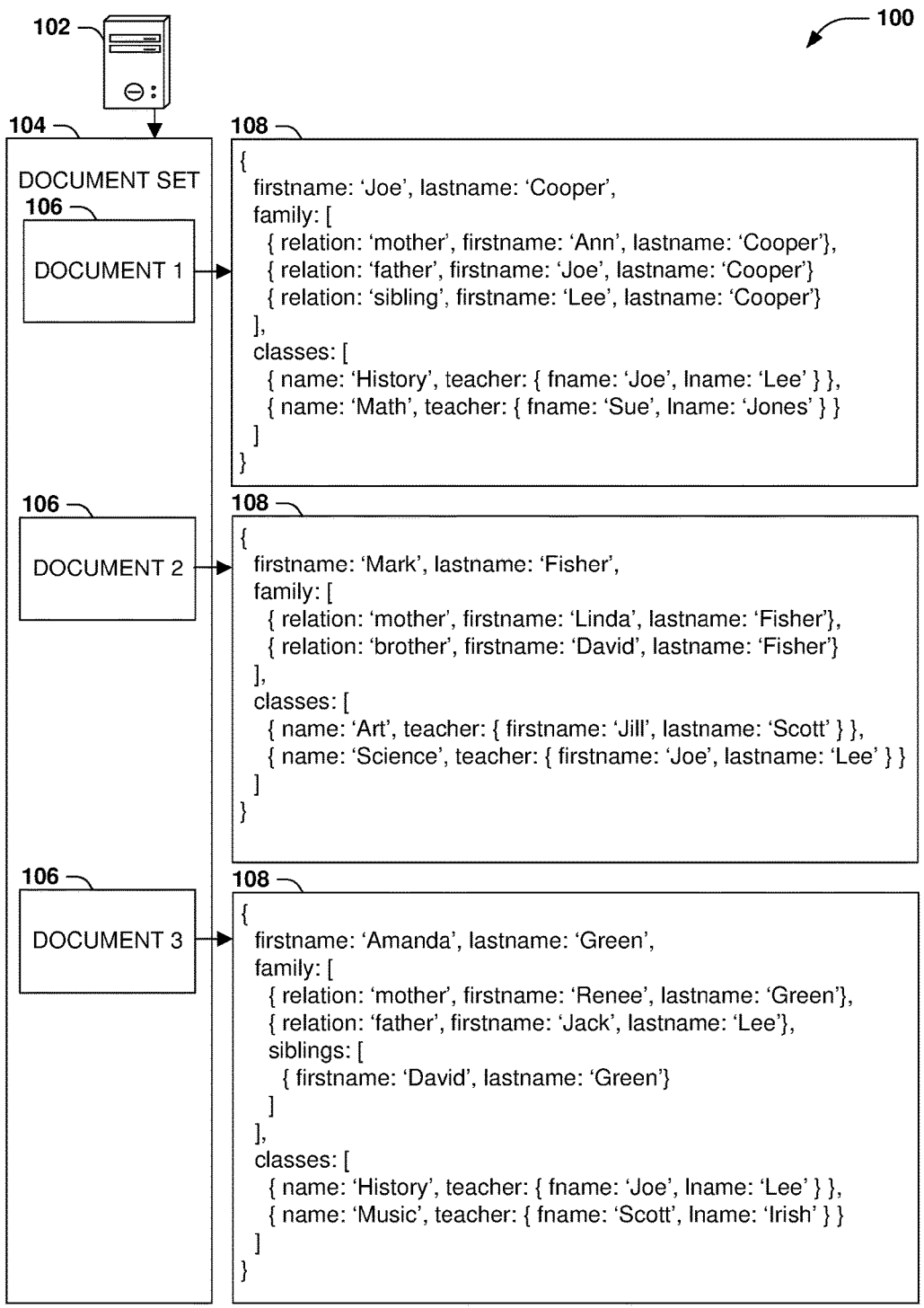
FIG. 1 is an illustration of an exemplary scenario featuring an exemplary document set comprising three hierarchically structured documents.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

Within the field of computing, many scenarios involve a document set comprising at least one document, where respective documents comprise data that may be structured in some manner. As a first example, the documents may comprise the records within the tables of a database. As a second example, the records may comprise objects in an object-oriented computing environment. As a third example, the records may comprise elements structured according to a hierarchical format, such as a variant of the Extensible Markup Language (XML) or JavaScript Object Notation (JSON) hierarchical formats. In such scenarios, a query is often provided by a user or an application as a request to identify documents matching one or more query criteria. The query may be specified according to a query model, such as a variant of the Structured Query Language (SQL), or the XPath query format that is adapted for XML-structured documents. A query processor may be applied to parse the query, identify the documents satisfying the query criteria, and return a set of query results. It may be appreciated that in such scenarios, the query model may significantly affect the usability, performance, unambiguity, accuracy, and robustness of the application of queries to the document set.

FIG. 1 presents an illustration of an exemplary scenario 100 featuring a device 102 storing a document set 104, comprising a set of documents 106 exhibiting a hierarchical structure 108 according to a hierarchical format. The documents 106 in this exemplary scenario 100 are structured according to the JavaScript Object Notation (JSON) format, comprising a recursable key/value store, where each element comprise a node name and either a node value, a list of other elements having an ordinal list sequence (denoted by square brackets), or a record comprising a set of one or more sub-elements (denoted by curled brackets). More specifically, the document set 104 in this exemplary scenario 100 depicts a student database, wherein each document 106 represents an individual student and contains some data describing the student, such as the student's name; the names and relationships of the student's relatives; and some details about classes in which the student is currently enrolled.

The hierarchically structured data presented in the exemplary scenario 100 of FIG. 1 may be stored and evaluated in many ways. As a first example, the document set 104 may be organized with particular focus on its hierarchical structure, which may facilitate the application of queries later submitted for application to the document set 104; e.g., the values of respective fields of the respective documents 106 may be indexed, such that queries specifying a value for a field may be rapidly fulfilled, even if the document set 104 is large. In such scenarios, the organization of the documents 106 is referred to as a schema, and respective documents 106 of the document set 104 are often anticipated to be structured according to the schema in order to enable schema-based queries to locate selected documents 106. To this end, the device 102 may index the documents 106 according to the schema, e.g., by identifying which documents have a particular value for the respective fields specified by the schema. Alternatively, each document 106 of the document set 104 may be organized without respect to its hierarchical structure; e.g., each document 106 may simply be regarded as a container of text, and a query may be submitted that requests documents containing text that matches the query criteria (e.g., a regular expression applied to find specified patterns in a body of text). A less rigorous indexing of the schemaless documents may be utilized to facilitate some basic text-based queries (e.g., tokenizing the text based on whitespace into keywords, and indexing each document 106 according to the keywords contained therein). In view of these details, it may be appreciated that the manner in which the documents 106 are regarded may affect the types of queries applicable to the document set 104, and the results of such queries.

FIG. 2 presents an illustration of an exemplary scenario 200 featuring a relational database 202 storing the document set 104 in the exemplary scenario 100 of FIG. 1. In this exemplary scenario 200, a relational database schema 204 is defined for the document set 102, comprising a set of table definitions 206 identifying the respective attributes in each document 106 and the types of values associated with each attribute. For example, the overall types of data provided in the document set 104 are identified as "Students," "Relatives," "Teachers," "Classes," and "Enrollment" (the latter table tying together the "Students" and "Classes" tables).

The relational database 202 also comprises a set of tables 208 conforming with the relational database schema 204, where respective tables 208 comprise a set of attributes 210, and a set of records 212 having a value for each attribute 210. When a document 106 is provided for inclusion in the document set 104, its contents are "shredded" into the corresponding tables 208. For example, the portions of each document 106 containing the student's name are inserted as a record 212 into the "Students" table 208; the portions identifying the student's relatives are inserted as records 212 into the "Relatives" table 208; and the portions of the student's class list identifying the classes in the student is enrolled are stored as records 212 in the "Teachers," "Classes," and "Enrollment" tables 208.

The "shredding" process is typically assisted by the relational database schema 204; e.g., a parser for the relational database 202 may split the document 106 into the attributes specified by the table definitions 206, and create records 212 in the tables 208 according to the parsing. Additionally, a hierarchical schema definition (such as an XML schema definition) may be provided to define the structure of the documents 106 in order to facilitate the parsing process. For example, a hierarchical schema definition for the document set 104 in the exemplary scenario 100 of FIG. 1 may specify that each record has one "firstname" field (type: string); one "lastname" field (type: string); one "family" field, comprising a list of records respectively comprising three strings named "relation," "firstname," and "lastname"; etc. The parser may use the hierarchical schema definition to parse the document 106 into a set of expected values, and may then use the relational database schema 204 to insert the expected values into the records 212 of the tables 208 of the relational database 202.

The relational database 202 may also include a relational query 214, specified in a query language (e.g., a variant of the Structured Query Language (SQL)), specifying a set of query criteria for identifying a desired set of records and extracting relevant information therefrom. For example, the relational query 214 in the exemplary scenario 200 of FIG. 2 specifies requests the first name and last name of each student enrolled in a class having a teacher with the last name of "Irish." The logic specified by the relational query 204 to achieve this result involves: (1) identifying the records 212 of the "Teachers" table 208 having the last name of "Irish"; (2) identifying the records 212 of the "Classes" table 208 having a value for the "Teacher" attribute that is equal to the value of the "ID" attribute of the identified "Teachers" records 212; (3) identifying the records 212 of the "Enrollment" table 208 having a value for the "Class" attribute that is equal to the value of the "ID" attribute of the identified "Classes" records 212; (4) identifying the records 212 of the "Students" table 208 having a value for the "ID" attribute that is equal to the value of the "Student" attribute of the identified "Enrollment" records 212; and (5) extracting the values from the "FIRSTNAME" and "LASTNAME" attributes of the identified records 212 of the "Students" table 208. By constraining the query process to a highly specific set of logical operations exactingly specified by the relational query 214, the relational database 202 may enable a very fast execution of the relational query 214.

While the "shredding" of the document set 104 according to the relational database 202 illustrated in the exemplary scenario 200 of FIG. 2 may present some advantages, such as highly organized and regular data and relational queries 214 that may be applied quickly, several disadvantages may also arise from this process, due to the tight dependence on the relational database schema 204 (and the hierarchical schema definition) that control the "shredding" process. As a first example, any discrepancies in the parsing process between the documents 106, the hierarchical schema definition, and the relational database schema 204 may present problems for the parsing process. For example, upon encountering an absence of mandatory fields in the document 106, the presence of additional fields in the document 106 that are not specified by either schema, or differences between the names or data types of fields in the document 106 and those defined by either schema, may result in an inaccurate parsing (e.g., storing numeric data in a string format, or storing a list of entries as a single string), the parsing may result in a loss of data (e.g., values that are not added to the relational database 202), or a validation error indicating to a user an inability to parse some data from the document 106 for insertion into the relational database 202. Such significant problems may arise even for minor and inconsequential errors, and may cascade into errors in other portions of the document set 104. For example, in the exemplary document set 104 in the exemplary scenario 100 of FIG. 1, an error may arise while parsing the second document 106 due to the identification of the teacher names by "firstname" and "lastname," rather than "fname" and "lname". As a result of this minor variation, the "Teacher" records may be omitted from the parsing; and as a result of a missing "Teacher" field, the "Classes" fields for this student may be omitted (due to violating the logical mandatory constraint that every class record specifies the name of the teacher), resulting in the creation of a student record for Mark Fisher that includes no classes. Alternatively, the parsing process may identify the "firstname" and "lastname" fields of the "teacher" record as unexpected fields that violate the hierarchical schema definition, and may refuse to import the document 106 citing a schema validation error.

As a second exemplary disadvantage, due to the tight binding between the query model and the relational database schema 204, relational queries 214 have to be designed as a painstaking, exactingly specified set of logical operations. As a first result, the simple operation represented by the relational query 214 in the exemplary scenario 200 of FIG. 2 ("identify the names of students enrolled in a class with a teacher having the last name 'Irish'") are specified as a lengthy, complicated relational query 214 rigorously defining the sequence of logical operations sprawling across all of the tables 208 of the relational database 202 to achieve the desired result. Developing such a relational query 214 may be a daunting process, and the resulting relational query 214 may be difficult to understand through casual review. Additionally, small logical errors in the relational query 214 may result in incorrect results; e.g., the relational query 214 in this exemplary scenario 200 fails to correlate the identified records of the "Classes" table 208 with identified records in the "Enrollment" table, resulting in either an error message or an incorrect presentation of results. As a third example, any changes to the relational database schema 204 may break the relational query 214, even if such changes are not perceived as pertinent to the task involved in the relational query 214. For example, changing the data type of the "ID" attribute of the "Classes" table 208 from an integer to a string, even if the current integers are represented as equivalent string values, may result in a data mismatch while comparing these string values to the integer values of the "Class" attribute in the "Enrollment" table 208 (e.g., the string "001" may be interpreted as different from the integer 001). Thus, even this comparatively trivial change may break the relational query 214, causing it to present incorrect results or error messages. Relational queries 214 therefore appear to be "fragile" and breakable even through inconsequential changes to apparently unrelated portions of the relational database 202. Such relational databases 202 are often difficult to administrate, since even small changes may have significant and unforeseen consequences.

It may be appreciated that the significant problems arising in the exemplary scenario 200 of FIG. 2 arise from the tight adherence of the parsing and querying processes to the precise definitions of the relational database schema 204. As an alternative, the document set 104 may be stored in an unstructured, "schemaless" manner, where each document 106 is regarded as simply containing text that may be queried through text parsing tools. For example, in order to identify the documents 106 representing students having a last name of "Lee" or a relative with a last name of "Lee," a text search may be applied to examine the text of each document 106 for the pattern "lastname: 'Lee'". However, a text search process of this type may disregard the semantics represented by the hierarchical structure 108 of each document 106, and may therefore return incorrect results. For example, this text search also results in the identification of the document 106 for Mark Fisher, who does not have a relative with the last name of "Lee," but who has a teacher with the last name of "Lee." A text search incorrectly identifies the second document 106 as a match for the query due to the inability of the text query to account for the hierarchical structure 108 of the documents 106. More precise text processing tools may be utilized, such as regular expressions, but these tools may exhibit similar types of fragility as relational queries 214. For example, changes in the order in which fields are specified may present no semantic difference, but may break a regular expression that identifies documents having fields specified in a particular order.

B. Presented Techniques

In view of the significant disadvantages resulting from both highly schema-bound query processing and schemaless query processing, the techniques presented herein provide an alternative query model that recognizes and evaluates the general structure of hierarchically structured documents 106, but that is not unduly constrained by the structure. That is, a query may specify structural features of a document 106 that are relevant to the query, but may omit unrelated structural details. Such queries may be easier to develop and to understand; may tolerate significant variance and changes to other portions of the schema of the documents 106; and may enable a flexible specification of even the relevant structural portions of the query. In particular, these queries may be formulated to describe a few properties of a portion of a hierarchically structured document 106—i.e., describing a selection of a "twig" of the "tree" structure of the document. Additionally, "twig" queries may be applied to the native content of the documents 106, rather than "shredding" the documents 106 into isolated abstractions such as tables 208, thereby avoiding parsing techniques that may introduce complexity and discrepancies. Finally, in order to expedite the fulfillment of queries, the documents 106 of a document set 104 may be indexed according to the hierarchical structure 108, and in a manner that is flexible and queryable through the query model.

Figure 3:
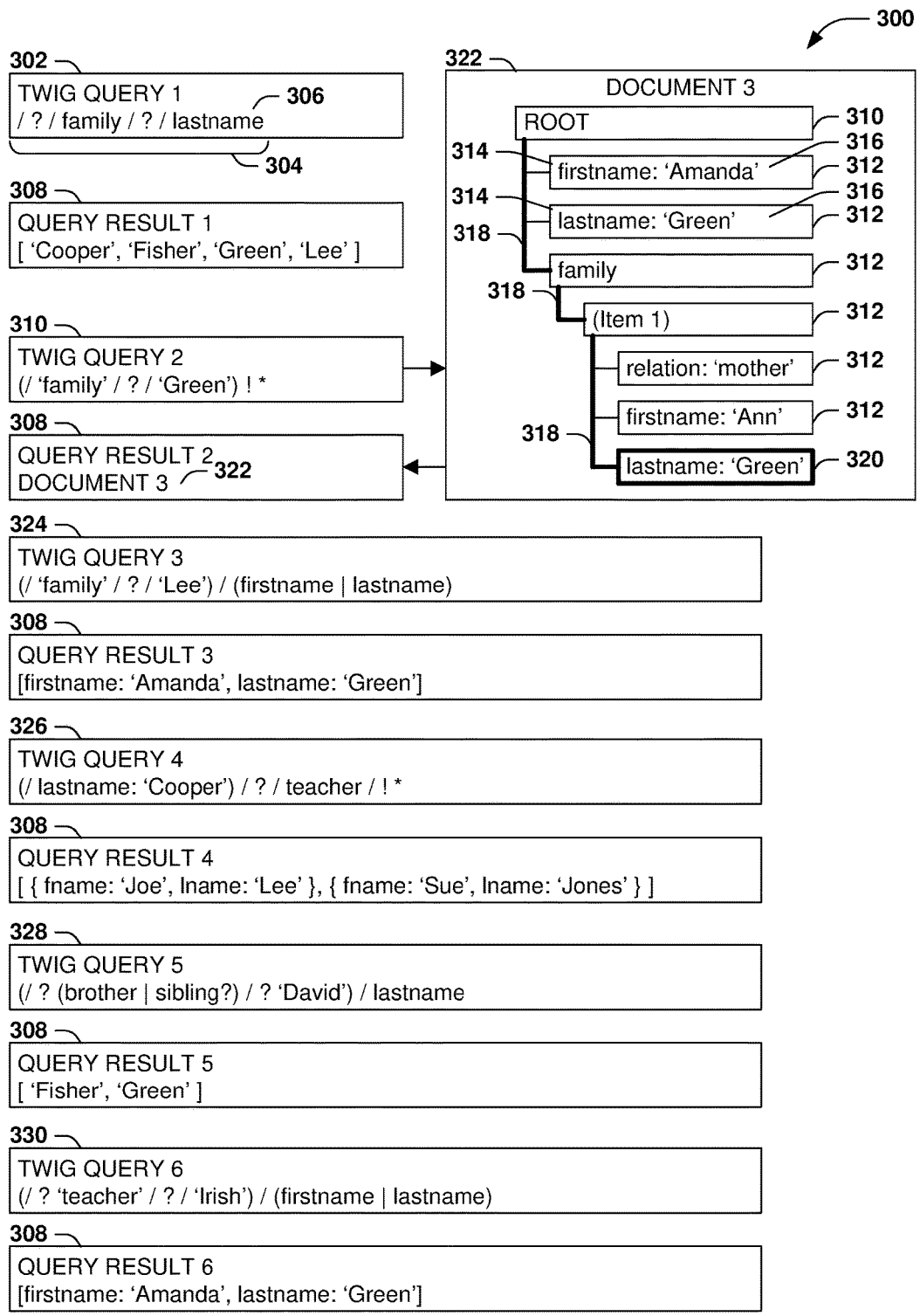
FIG. 3 is an illustration of an exemplary scenario featuring a set of twig queries applicable to the exemplary document set of FIG. 1 in accordance with the techniques presented herein.

FIG. 3 presents an illustration of an exemplary scenario 300 featuring a view of a portion of a document 106 of the exemplary document set 104 in the exemplary scenario 100 of FIG. 1 (particularly, the third document) as a collection of nodes having a structure. For example, the document 106 includes a root node 310 and a series of nodes 312 depending therefrom, either directly or through another node. Each node 312 may comprise a node name 314 (e.g., "firstname" or "family"), and some nodes may also a node value 316 (e.g., "Amanda"). Each node 312 also comprises a node path 318, such as the sequence of nodes 312 from the root node 310 to the node 312 (where the nodes 312 included in the node path 318 are referred to as "path nodes").

The document 106 presented herein has a distinct and definite hierarchical structure 108 that may be targeted a query that does not specify every precise details of the hierarchical structure 108 of desired nodes 312, but, rather, only specifies the hierarchical structural details that are relevant to the query. For example, a query may request a selection of nodes 312 having the node value 316 "Green" that are subordinate to a parent node 312 having a node name 314 of "family." For the intent of the query, it may not matter whether the selected nodes 312 are directly subordinate to the parent node 312, are contained in a structure of the parent node 312 such as a list, or are several levels deeper in the hierarchical structure 108 of the document 106. It may not matter whether the node name 314 of the selected nodes 312 is "firstname" or "lastname," or even whether such fields are consistent across documents 106 (e.g., a first document 106 specifying a "firstname" node name 314, and a second document 106 specifying an "fname" node name 314 for the corresponding nodes 312), or where the parent node 312 is located in the hierarchical structure 108. By limiting the "twig" query to only the relevant semantic and structural criteria, this query model may enable the query to be accurately applied to a document set 104 with significant variance in hierarchical structure 108.

The exemplary scenario 300 of FIG. 3 also presents a series of exemplary queries and query results 308 to demonstrate the capabilities of this query model. These exemplary queries simply identify a query node path 304 and a query node identifier 306 (i.e., the query name 314 of nodes 312 matching the query), such that any documents 106 containing one or more matching node 320 with such a query node path 304 may be selected to satisfy the query. Notably, the query path 304 often does not specify the precise details of the node path 318 of the matching node, but only the relevant details of the node path 318 and/or the query node identifier 306 indicating the 320.

For example, a first query 302 specifies a node path 304 indicating requesting the extraction of the node values 316 of matching nodes 320 matching the query node identifier 306 of "lastname," and that are subordinate to a parent node 312 having a node name 314 of "family" (i.e., the set of last names of the family members of the students). When applied to the document set 104 in the exemplary scenario 100 of FIG. 1, the first query 302 may result in a query result 308 comprising the matching node values "Cooper," "Fisher," "Green," and "Lee." Notably, the first query 302 does not specify where the "family" nodes 312 reside in the hierarchical structure 108 of the documents 106, or a specific hierarchical relationship of the "lastname" nodes 312 and the "family" nodes 312, other than that the former nodes 312 descend from the latter nodes 312. The flexibility of these parameters is denoted by the ? character inserted between the nodes, indicating that any intervening hierarchical structure is acceptable for the first query 302.

A second query 310 requests an identification of every document 106 having at least one node 312 having the node value 316 "Green" that is subordinate to a node 312 having the node name "family". When applied to the document set 106 in the exemplary scenario 100 of FIG. 1, the second query 310 results in the identification of the third document 106 as a matching document 322 of the second query 310 (and, more specifically, may return the contents of the matching document 322 in response to the second query 310).

A third query 324 requests the identification of matching 322 containing at least one matching node 320 having the node value 316 "Green" that descends (directly or indirectly) from a parent node having the node name 314 "family." From the identified documents, the third query 324 requests the extraction of node values 316 for the "firstname" and "lastname" nodes 310 descending from the root node 310 of the document 106. Accordingly, the query result 308 for the third query 324 when applied to the document set 104 in the exemplary scenario 100 of FIG. 1 comprises the first and last name of the student in the third document 108. Notably, the third query 324 specifies the extraction of the matching nodes 320 "firstname" and "lastname" that descend directly from the root node 310, since this detail of the hierarchical structure is relevant to the third query 324 (e.g., in order to differentiate the undesired "firstname" and "lastname" nodes in the document 106 that descend from the "family" node 312 or elsewhere in the document 106).

The following queries in the exemplary scenario 300 of FIG. 3 illustrate additional features enabled by the flexible query model provided herein. A fourth query 326 first identifies matching documents 322 containing a first matching node 320 matching the query node identifier 306 "Cooper" (i.e., the third document 106 in the exemplary document set 104 of FIG. 1), and then requests the identification of a second matching node 320 within such documents having the node name 314 "teacher," and the extraction of the entire subset of nodes 312 descending from the second matching node 320 (specified using the "!" operator to "cut" the document at the specified node 312). The query result 308 accordingly presents the subset of nodes descending from the "teacher" node 312 of the matching document 322 (i.e., the names of all of the teachers of the student represented by the matching document 322). Notably, the "cut" operator does not have a recognized equivalent in relational query languages, where the operation might be described as "select the entire set of nodes related to a specified node, and the nodes recursively related to those nodes."

A fifth query 328 specifies an alternative selection among query node identifiers 306, such as the identification of all documents 106 including a matching node 320 having the node value 316 "David" that descend from a node 312 having either the node name 314 "brother" or having the node "sibling," and the extraction of the node values 316 for the "lastname" nodes 312 descending directly from the root nodes 310 of the matching documents 322. Accordingly, when the fifth query 328 is applied to the document set 104 in the exemplary scenario 100 of FIG. 1, the query result 308 includes both the last name "Fisher" (from the second document 106 containing a first node 312 having a node name 314 "brother," and an (indirectly) descending node 312 having a node value 316 of "David") and the last name "Green" (from the third document 106 containing a first node "siblings," and an (indirectly) descending node 312 having a node value 316 of "David"). This alternative specification of node details in the "twig" query model enables a flexible description of matching nodes 320, and promotes the tolerance of such queries to cope with variable hierarchical structures 108 among the documents 106 of the document set 104.

A sixth query 330 specifies the identification of matching documents 322 having a first node 312 having a query node identifier 306 of "teacher," and a (directly or indirectly) descending node 312 having a query node identifier 306 of "Irish"; and from such matching documents 322, the sixth query 304 requests an extraction of the node values 316 of the "firstname" and "lastname" nodes 312 descending directly from the root node 310. The sixth query 330 produces a query result 308 having the first name "Amanda" and the last name "Green." It may be appreciated that the sixth query 330 specifies the same intent as the relational query 214 in the exemplary scenario 200 of FIG. 2: both queries request the first and last names of students having a teacher with the name "Irish." However, the sixth query 330 is considerably easier to read, as it describes only the relevant details of the "twigs" of the matching documents 322, and does not rigorously specify the unrelated details of the hierarchical structure 108 of the matching documents 322. Moreover, the sixth query 330 is capable of returning an accurate query result 308 despite significant variance in unrelated aspects of the hierarchical structure 108 of the documents 106 of the document set 104, in contrast with the fragility of the relational query 214 in the event of even inconsequential changes to apparently unrelated portions of the relational database 202. In this manner, the "twig" query model presented herein enables the specification and evaluation of queries that are easier to develop and understand, and that remain accurate despite variance in unrelated portions within and among the documents 106 of the document set 104; and that are tolerant of changes to the hierarchical structure 108 of the documents 106 that do not affect the semantics of the query.

C. Exemplary Embodiments

Figure 4:
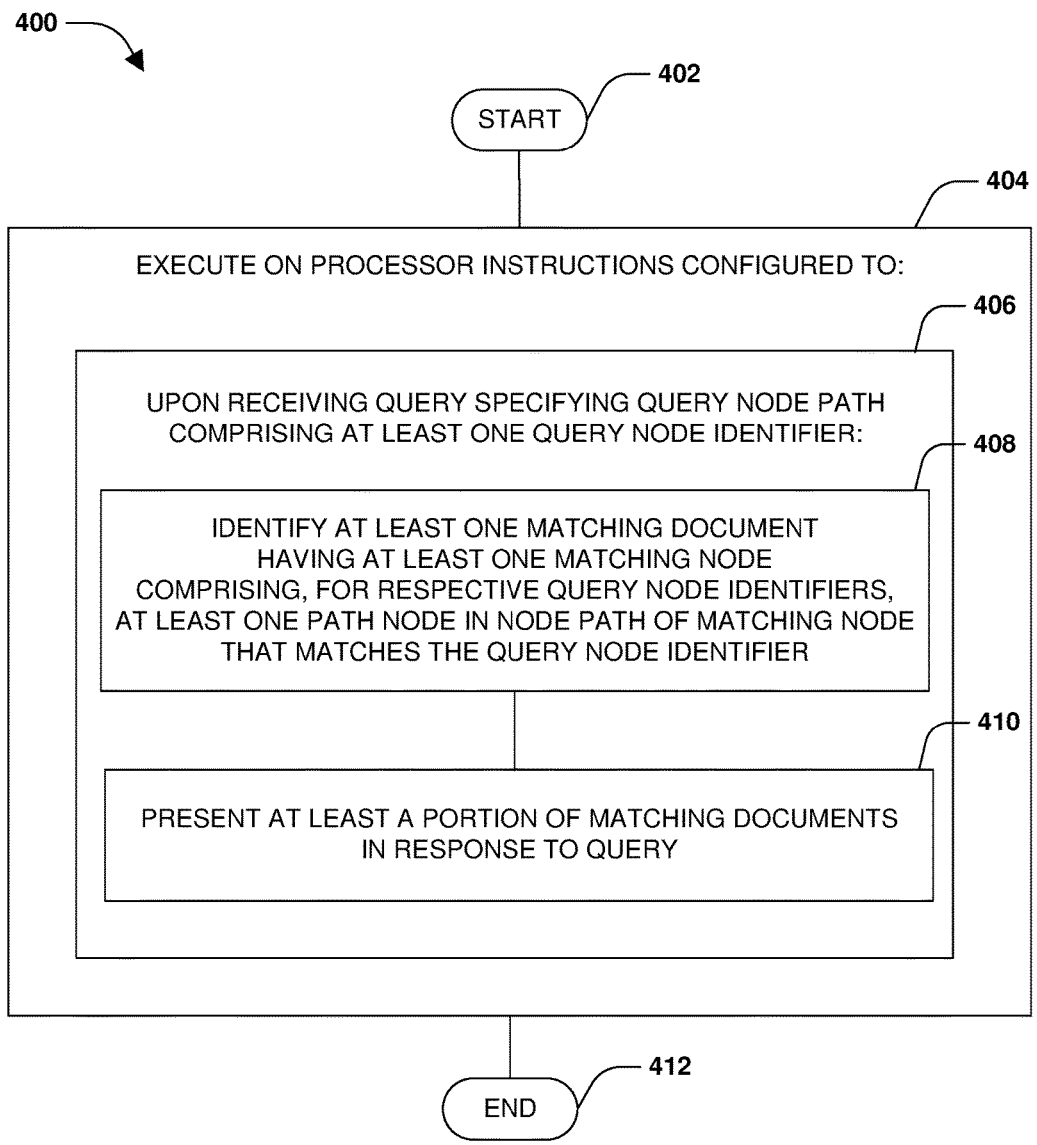
FIG. 4 is an illustration of an exemplary method of applying queries to the documents of a document set in accordance with the query model presented herein.

FIG. 4 presents a first exemplary embodiment of the techniques presented herein, illustrated as an exemplary method 400 of applying queries to a document set 104 comprising at least one document 106, which in turn comprises at least one node 312 having a node name 314 and a node path 318 from a root node 310 to the node 312. The exemplary method 400 may be performed by a device 102, and may be implemented, e.g., as a set of instructions stored in a memory component of the device 102, such as a memory circuit, a platter of a hard disk drive, a solid-state storage device, or a magnetic or optical disc, and organized such that, when executed by the device 102 (e.g., on a processor of the device 102), cause the device 102 to operate according to the techniques presented herein. The exemplary method 400 begins at 402 and involves executing 404 the instructions on a processor of the device. Specifically, these instructions may be configured to, upon receiving 406 a query specifying a query node path 304 comprising at least one query node identifier 306, identify 408 at least one matching document 322 having at least one matching node 320 comprising, for respective query node identifiers 306, at least one path node 312 in the node path 318 of the matching node 320 matching the query node identifier 306. The instructions are also configured to present 410 at least a portion of the at least one matching document 322 in response to the query. Having achieved the application of the query to the document set 104 and the presentation of a query result, the exemplary method 400 achieves the techniques presented herein, and so ends at 412.

Figure 5:
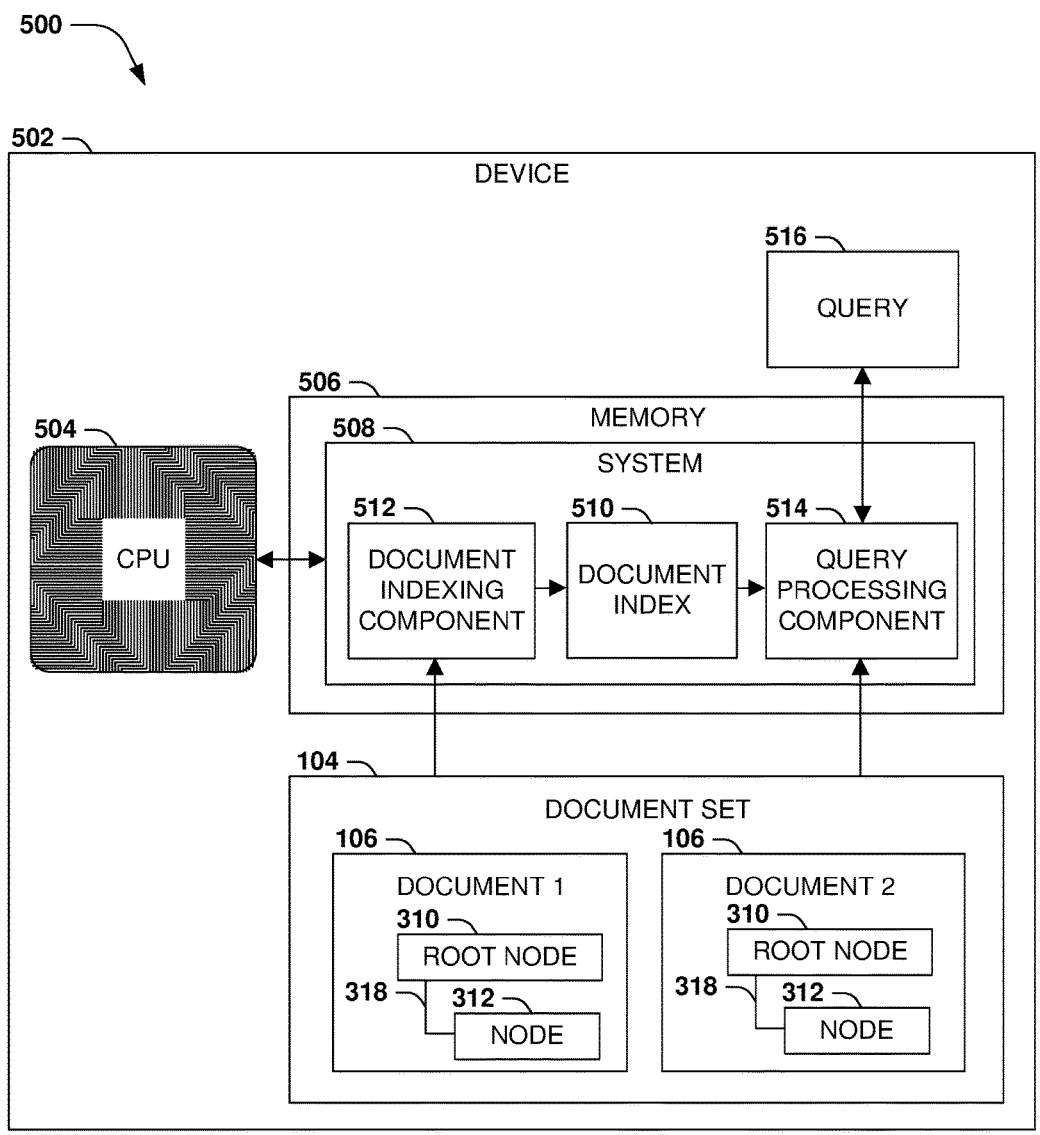
FIG. 5 is a component block diagram illustrating an exemplary system for applying queries to the documents of a document set in accordance with the query model presented herein.

FIG. 5 presents a second exemplary embodiment of the techniques presented herein, illustrated as an exemplary scenario 500 featuring an exemplary system 508 configured to apply queries to the documents 106 of a document set 104, where respective documents 106 comprise at least one node 312 having a node name 314 and a node path 318 from a root node 310 to the node 312. Respective components of the exemplary system 508 may be implemented, e.g., as a set of instructions stored in a memory 506 of the device 502 and executable on a processor 504 of the device 502, such that the interoperation of the components causes the device 502 to operate according to the techniques presented herein. The exemplary system 508 comprises a document index 510 indicating, for respective query node paths 304, at least one matching document 322 having at least one matching node 320 comprising, for respective query node identifiers 306, at least one path node 312 in the node path 318 of the matching node 322 that matches the query node identifier 306. The exemplary system 508 also comprises a document indexing component 512, which is configured to, upon receiving a document 106, index the document 106 in the document index 510 according to, for respective nodes 312, the node path 318. The exemplary system 508 also comprises a query processing component 512, which is configured to, upon receiving a query 516 specifying a query node path 304 comprising at least one query node identifier 306, examine the document index 510 to identify at least one matching document 322 having at least one matching node 322 comprising, for respective query node identifiers 306, at least one path node 312 in the node path 312 of the matching node 318 having a node name 314 matching the query node identifier 306; and to present at least a portion of the matching documents 322 in response to the query 516. In this manner, the exemplary system 508 achieves within the device 502 the application of the techniques presented herein.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 6:
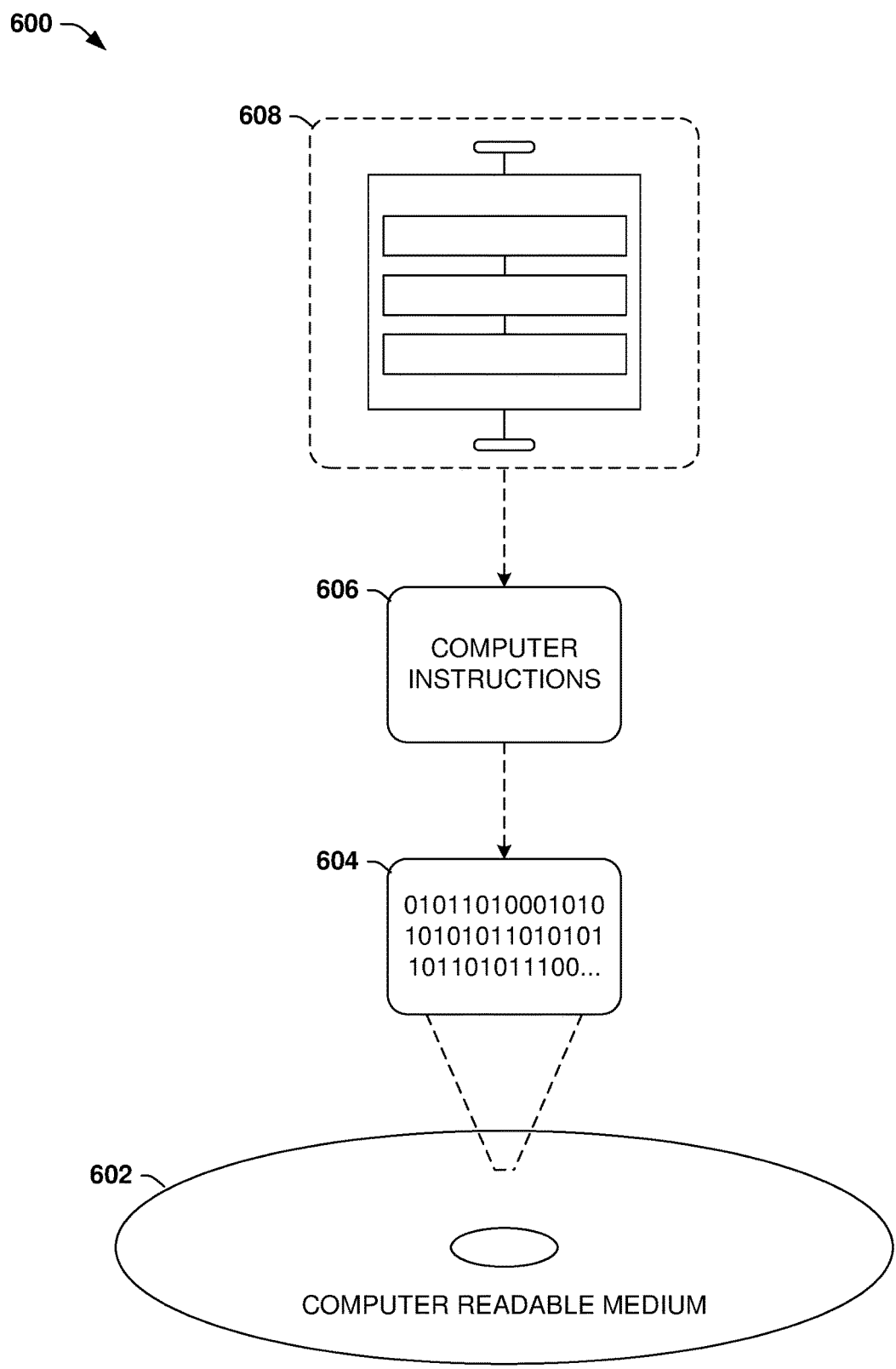
FIG. 6 is an illustration of an exemplary computer-readable medium comprising processor-executable instructions configured to embody one or more of the provisions set forth herein.

An exemplary computer-readable medium that may be devised in these ways is illustrated in FIG. 6, wherein the implementation 600 comprises a computer-readable medium 602 (e.g., a CD-R, DVD-R, or a platter of a hard disk drive), on which is encoded computer-readable data 604. This computer-readable data 604 in turn comprises a set of computer instructions 606 configured to operate according to the principles set forth herein. In one such embodiment, the processor-executable instructions 606 may be configured to perform a method 608 of applying queries to the documents of a document set, such as the exemplary method 400 of FIG. 4. In another such embodiment, the processor-executable instructions 606 may be configured to implement a system for applying queries to the documents of a document set, such as the exemplary system 508 of FIG. 5. Some embodiments of this computer-readable medium may comprise a computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 400 of FIG. 4 and the exemplary system 508 of FIG. 5) to confer individual and/or synergistic advantages upon such embodiments.

D1. Scenarios

A first aspect that may vary among embodiments of these techniques relates to the scenarios wherein such techniques may be utilized.

As a first variation of this first aspect, the techniques presented herein may be utilized with many types of devices 102, such as servers, server farms, workstations, laptops, tablets, mobile phones, game consoles, and network appliances. Such devices 102 may also provide a variety of computing components, such as wired or wireless communications devices; human input devices, such as keyboards, mice, touchpads, touch-sensitive displays, microphones, and gesture-based input components; automated input devices, such as still or motion cameras, global positioning service (GPS) devices, and other sensors; output devices such as displays and speakers; and communication devices, such as wired and/or wireless network components.

As a second variation of this first aspect, the documents 106 of the document set 104 may be specified in many ways (e.g., as human-readable or human-unreadable data, and having a hierarchical structure 108 organized according to the sequence of the elements of the document 106, or according to pointers within the document 106). As one example, the document set 104 may comprise a JSON document store, configured to store, access, and index documents 106 structured in a variant of the Extensible Markup Language (XML) format, or in a variant of the JavaScript Object Notation (JSON) hierarchical data format.

As a third example, the queries 516 may be specified in various human-readable or human-unreadable query languages, and may present many types of syntax, including many sets of symbols representing various operations. Moreover, the query language may include a variable set of operators that apply various operations to the traversal, identification, selection, extraction, and formatting of the nodes 312 of the documents 106. These and other variations may be suitable for implementations of the techniques presented herein.

D2. Query Criteria

A second aspect that may vary among embodiments of the techniques presented herein relates to the types of criteria that may be specified in queries 516 for application to a document set 104.

As a first variation of this second aspect, a query 516 may specify various types of criteria in the query node path 304 for selecting matching nodes 320. As a first such example, the query node identifier 306 may identify the node name 314 of a matching node 320; the node value 316 of a node 320; the data type of the node value 316 of a matching node 320; or any combination of such properties (e.g., either the node name 314 or the node value 316). As a third such example, the query node path 304 may specify a query node identifier set that presents at least two alternative query node identifiers, and matching nodes 320 may be identified that match any of the alternative query node identifiers. For example, the fifth query 328 in the exemplary scenario 300 of FIG. 3 specifies that nodes matching either the first alternative query node identifier "brother" or the second alternative query node identifier "sibling?" are to be regarded as matching nodes 320. Alternatively or additionally, an identifier set may be specified as a logical exclusive or (i.e., matching one of two or more alternative query node identifiers, but not more than one), or a logical and (i.e., matching all of two or more query node identifiers). For example, several queries 516 in the exemplary scenario 300 of FIG. 3 specify a selection of matching nodes 320 having both a specific node name 314 and a specific node value 316 (e.g., "lastname: 'Cooper'"). As a second such example, a query node identifier 306 may specify one or more query node value ranges, wherein matching nodes 320 are identified that comprise a node value 316 within the query node value range (e.g., a string value having a first character alphabetically falling between the letters 'A' and 'D'). A query may also feature a Boolean logic specifying a logical framework for identifying matching nodes 320 (e.g., nodes 320 satisfying either the query node identifier 306 "mother" or "stepmother," but not "mother-in-law").

As a second variation of this second aspect, the query 516 may specify various properties of the query node path 304. As a first such example, the query node path 304 may specify particular hierarchical relationships for one or more matching nodes 320, such as a matching node 320 that descends directly from the root node 310 of the document 106. Alternatively, the query node path 304 may explicitly or tacitly omit the details of hierarchical relationships concerning a matching node 320. For example, a query node path 304 specified as "/? lastname" may indicate, through the inclusion and position of the ? operator, the selection of matching nodes 320 that match the 'lastname' query node identifier 306, but that exist anywhere in the hierarchical structure 108 of the document 106. As a third such example, the query node path 304 may specify at least two matching nodes 306, and a hierarchical relationship therebetween. For example, a query node path 304 may include a first query identifier 306 of a first matching node 320 having a query node path 318, and a second query node identifier 306 of a second matching node 320 having a second node path 318 that is relative to the first node path (e.g., superior to the first matching node 320, subordinate to the first matching node 320, a peer to the first matching node 320, etc.) The query 516 may be processed by identifying matching document 322 that have a first matching node 320 matching the first query node identifier 306, and a second matching node that matches the second query node identifier 306 as well as a node path 318 satisfying the relationship with the node path 318 of the first matching node 320.

As a third variation of this second aspect, the query 516 may specify one or more wildcard operators that provide various levels of flexibility in the query criteria. As a first such example, an optional operator may specify that a query criterion is optional (i.e., that matching nodes 320 may or may not fulfill the specified query criterion). For example, the query node identifier 306 "sibling?" may include both matching nodes 320 that match the identifier "sibling" and matching nodes 320 that match the identifier "siblings." As a second such example, a Kleene star operator (e.g., the * operator) may specify a selection of all nodes of a particular type; e.g., the query node path "/*" may indicate all of the nodes 312 of the document 106.

As a fourth variation of this second aspect, the query 516 may identify a query node subset of a document 106, and one or more query criteria to be applied only to the query node subset. While evaluating a document 106, a query processor may select a node subset comprising the nodes 312 of the document 106 that are within the query node subset, and may apply a remainder of the query 516 to only the node subset. As a second such example, the "cut" operator presented in the fourth query 326 indicates that, for a matching node 320 that matches a query node identifier 306, the tree of nodes 312 is to be "cut" and limited to the child nodes descending (directly or indirectly) from the matching node 320. The "cutting" of nodes 312 may then be returned, further queried, etc. As one such example, to any of the documents 106 in the exemplary scenario 100 of FIG. 1, an operator may specify a "cut" applied to the "classes" node, and may provide a set of query criteria for evaluating (only) the nodes 312 that are subordinate to the "classes" node 312. The "cut" may also be specified as an exclusive cut that excludes the matching node 320, or an inclusive cut that includes that matching node 320 in the "cut" of the document 106. These and many other query criteria may be included in query models according to the techniques presented herein.

D3. Query Effects

A third aspect that may vary among embodiments of these techniques relates to the effect of a query 516 to be applied to the matching nodes 320 and matching documents 322.

As a first variation of this third aspect, a query 516 may specify that various portions of a matching document 320 are to be returned as a query result. As a first example, the query 516 may request to identify the matching documents 322; to return the full contents of matching documents 322; or to return the node names 314, node values 316, and/or query node paths 318 if one or more of the matching nodes 320 within each matching document 322. As a second example, the query 516 may request to return other nodes 213 that are related to each matching node 320, such as at least one child node that descends from the matching node 320 (e.g., returning a "cut" of a document 106 from a matching node 320, and optionally including or excluding the matching node 320).

As a second variation of this third aspect, a query 516 may indicate that a set of query results are to be paginated. This variation may be advantageous, e.g., if the query result set is large, and if the application or user submitting the query 516 is only interested in a subset of the query results. For example, the device 102 may partition the query results into two or more query result ranges, and may initially return the query results within a first query result range (e.g., the first ten matching documents 322 and/or matching nodes 320).

The query results within additional query result ranges may be returned upon receiving a request to return a second query result range.

As a third variation of this third aspect, a query 516 may indicate that particular operations are to be applied to matching documents 322 and/or matching nodes 320. For example, a query 516 may include a script that is to be applied to matching nodes 320, where the script comprises further query criteria to be applied to the matching nodes 320, a modification of the document 106 containing the matching nodes 320 or another document 106 of the document set 104, and/or an adjustment of the query results generated from the matching nodes 320. Accordingly, a device 102 may, upon identifying a matching node 320 and/or matching document 322 to which the query 516 requests the application of a script, apply the script to the matching node(s) 320 and/or matching document(s) 322. These and other effects may be applied to the matching nodes 320 and/or matching documents 322 of an evaluated query 516 in accordance with the techniques presented herein.

D4. Query Indexing

A fourth aspect that may vary among embodiments of these techniques involves an indexing of the documents 106 of a document set 104. In some scenarios, indexing may be omitted, and a query 516 may be evaluated through an ad hoc examination of each document 106. However, other scenarios may generate and utilize a document index to expedite the evaluation of queries 516. In particular, it is noted that whether or not the documents 106 of the document set 104 conform to a hierarchical schema definition, hierarchically structured indexing may still be applicable and advantageous.

As a first variation of this fourth aspect, a device 102 may generate an index of the nodes 312 comprising each document 106 of the document set 104. For example, instead of the hierarchical structure 108 that represents semantic relationships among the nodes 312 of the document 104, the document index may comprise a lookup indicating whether, and where, respective nodes 312 arise within the document 106 (e.g., for the second document 106 in the document set 104 of the exemplary scenario 100 of FIG. 1, the 'lastname' node name 314 is found in each node 314 of the /family/ collection, and in the teacher subnode of each item in the /classes/collection). As one such example, upon receiving a document 106 to be included in the document set 104, the device 102 may index the document 106 in a document index according to, for respective nodes 312 of the document 106, the node path 318, the node name 314, and/or the node value 316; and the device 102 may evaluate a query 516 by, for respective query node identifiers 306, examine the document index for each document 106 to identify the matching nodes 320 in the document 106 that match the query node identifier 306. Additionally, upon receiving an updated document 106 of the document set 104, the device 102 may re-index the nodes 312 of the updated document 106.

As a second variation of this third aspect, a device 102 may utilize a reverse index that indicates, for respective query node paths 304, which documents 106 of the document set 104 contain a matching node 320. As one such example, upon receiving a document 106 to be included in the document set 104, the device 102 may index the respective nodes 312 (e.g., according to node names 314, node values 316, and/or node paths 318), and may evaluate a query 516 by, for respective query node identifiers 306, examine the document index to identify the matching documents 322 having at least one matching node 320.

As a third variation of this third aspect, a device 102 may endeavor to consolidate the documents 106 of a document set 104 in order to address variations in the hierarchical organization 108 of the documents 106. For example, while generating a document index or a reverse index, the device 102 may endeavor to identify two or more matching nodes 320 that match a query node path through different node paths 318, ad may consolidate the matching nodes 320 during the indexing. This consolidation may be determined, e.g., by identifying similarities among the different node paths 318. For example, in the document set 104 in the exemplary scenario 100 of FIG. 1, the first document 106 presents a "family" record including a node 312 with a "sibling" node name 314, while the third document 106 presents a node 312 representing a sibling but organized into a "siblings" collection. The device 102 may, while indexing these documents 106, identify that these node paths are similar, and may conclude that the records identify the same type of information for each document 106. Accordingly, the node names 314 and node values 316 of these records may be consolidated in the index and indexed according to a "sibling" query node path 304, despite having different node paths 318. This consolidation may facilitate the semantically accurate evaluation of queries 516 despite inconsequential variance in the hierarchical organization 108 of the documents 106.

As a further variation of this third aspect, the consolidation may be directed by various determinations. As a first such example, the consolidation of nodes 312 may be performed by identifying a similarity degree of the different node paths 312 of the matching nodes 320, and consolidating the matching nodes 320 in the document index only if the similarity degree of the different node paths 318 exceeds a similarity degree threshold. For example, a user of the device 102 may specify and adjust the similarity degree threshold in order to control the aggressiveness of the consolidation in consolidating differently represented nodes 312. As a second such example, the device 102 may receive instructions from a user that may facilitate the consolidation; e.g., the user may specify some basic details or "hints" about the document set 104, such as the fact that each students may have one or more siblings as family members, and the consolidation may involve seeking nodes 312 resembling the query node identifier 306 "sibling" (or a synonym, such as "brother" or "sister") for consolidation. User hinting as to equivalent properties and relationships that may be found among differently organized nodes 312 may therefore facilitate an accurate consolidation of the nodes 312 in the indexing.

FIG. 7 presents an illustration of an exemplary scenario 700 featuring an indexing and consolidation of two documents 106 from the document set 104 in the exemplary scenario 100 of FIG. 1. In this exemplary scenario 700, a reverse index 702 is generated that identifies, for respective query node paths 304, whether each document 106 contains at least one matching node 320 for the query node path 304. When presented with a query 516 including a particular query node path 304 and query node identifier 306, rather than examining each document 106 of the document set 104, the device 102 may examine the reverse index 702 to identify which documents 106 comprise at least one matching node 320 that matches the query node path 304 and query node identifier 306. Additionally, the reverse index 702 is generated by consolidating different but similar nodes 312 having only inconsequential organizational variations.

For example, the first document 106 identifies teachers by "fname" and "lname," while the second document 106 identifies teachers by "firstname" and "lastname." Nevertheless, recognizing the similarities of the node names 314, node values 316, and/or node paths 318 of these nodes 312, the reverse index 702 indicates that both documents 106 contain nodes 312 matching the "fname" and "lname" query node identifiers 306. In this manner, the reverse indexing and consolidation of the nodes 312 of the documents 106 of the document set 104 may be queried and identified in a semantically accurate manner that is tolerant of inconsequential variations in the hierarchical organization 316 of the documents 106. These and other variations in the indexing of the document set 104 may be devised and utilized in accordance with the techniques presented herein.

E. Computing Environment

Figure 8:
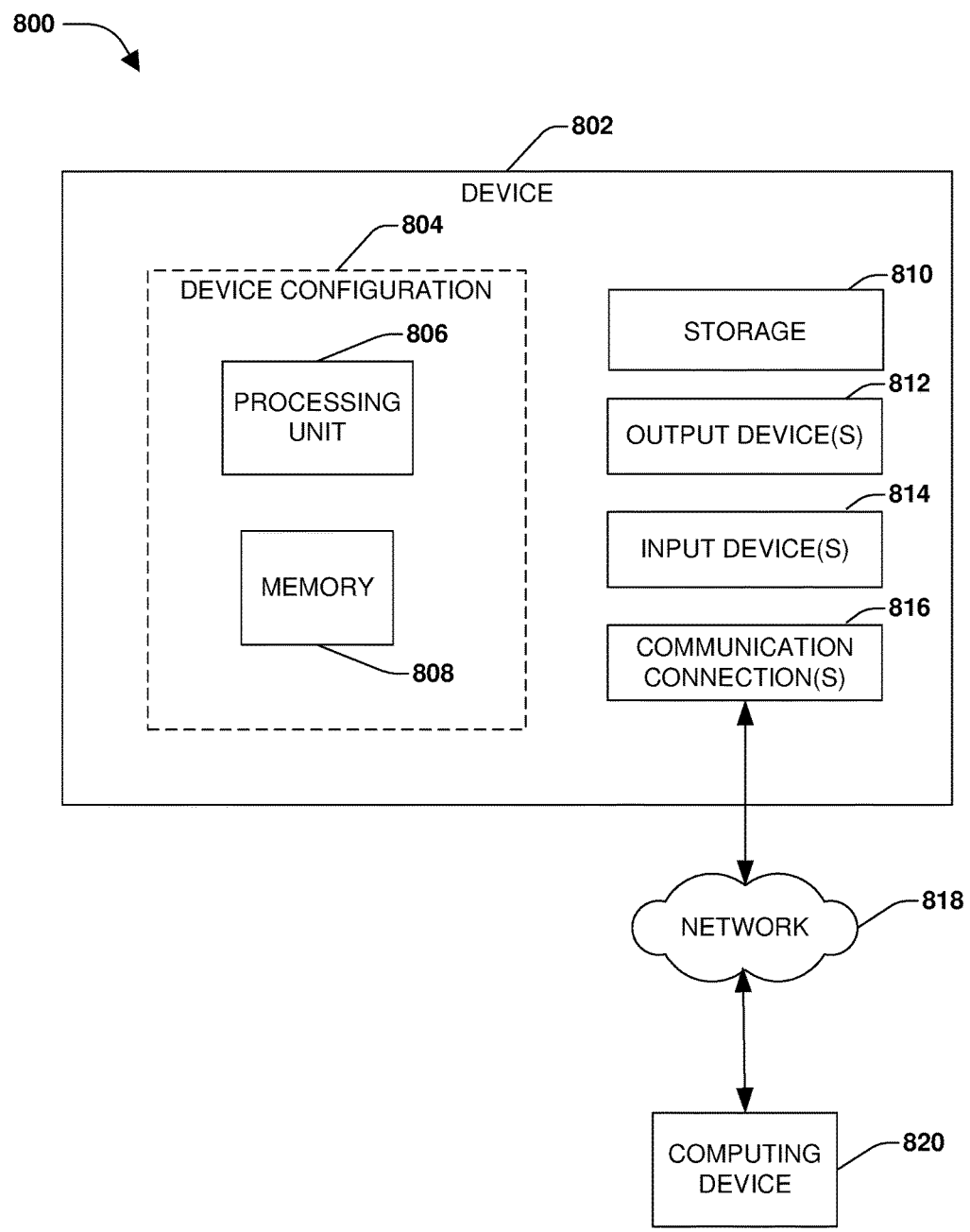
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 800 comprising a computing device 802 configured to implement one or more embodiments provided herein. In one configuration, computing device 802 includes at least one processing unit 806 and memory 808. Depending on the exact configuration and type of computing device, memory 808 may be volatile (such as RAM, for example), non-volatile (such as ROM, flash memory, etc., for example) or some combination of the two. This configuration is illustrated in FIG. 8 by dashed line 804.

In other embodiments, device 802 may include additional features and/or functionality. For example, device 802 may also include additional storage (e.g., removable and/or non-removable) including, but not limited to, magnetic storage, optical storage, and the like. Such additional storage is illustrated in FIG. 8 by storage 810. In one embodiment, computer readable instructions to implement one or more embodiments provided herein may be in storage 810. Storage 810 may also store other computer readable instructions to implement an operating system, an application program, and the like. Computer readable instructions may be loaded in memory 808 for execution by processing unit 806, for example.

The term "computer readable media" as used herein includes computer storage media. Computer storage media includes volatile and nonvolatile, removable and non-removable media implemented in any method or technology for storage of information such as computer readable instructions or other data. Memory 808 and storage 810 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 802. Any such computer storage media may be part of device 802.

Device 802 may also include communication connection(s) 816 that allows device 802 to communicate with other devices. Communication connection(s) 816 may include, but is not limited to, a modem, a Network Interface Card (NIC), an integrated network interface, a radio frequency transmitter/receiver, an infrared port, a USB connection, or other interfaces for connecting computing device 802 to other computing devices. Communication connection(s) 816 may include a wired connection or a wireless connection. Communication connection(s) 816 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 802 may include input device(s) 814 such as keyboard, mouse, pen, voice input device, touch input device, infrared cameras, video input devices, and/or any other input device. Output device(s) 812 such as one or more displays, speakers, printers, and/or any other output device may also be included in device 802. Input device(s) 814 and output device(s) 812 may be connected to device 802 via a wired connection, wireless connection, or any combination thereof. In one embodiment, an input device or an output device from another computing device may be used as input device(s) 814 or output device(s) 812 for computing device 802.

Components of computing device 802 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 802 may be interconnected by a network. For example, memory 808 may be comprised of multiple physical memory units located in different physical locations interconnected by a network.

Those skilled in the art will realize that storage devices utilized to store computer readable instructions may be distributed across a network. For example, a computing device 820 accessible via network 818 may store computer readable instructions to implement one or more embodiments provided herein. Computing device 802 may access computing device 820 and download a part or all of the computer readable instructions for execution. Alternatively, computing device 802 may download pieces of the computer readable instructions, as needed, or some instructions may be executed at computing device 802 and some at computing device 820.

F. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of applying queries to a document set comprising at least one document, respective documents comprising at least one node comprising a node name and a node path from a root node of the document, the method comprising:
    indexing the documents of the document set to generate a reverse index that indicates, for a query node identifier, a matching document subset of the document set, wherein respective documents of the matching document subset comprise at least one matching node comprising at least one path node in the node path of the matching node that matches the query node identifier; and
    fulfilling a query specifying a query node path comprising at least one query node identifier by:
        using the reverse index, select a matching document of the matching document subset;
        identifying, in the matching document, at least one matching node comprising, for respective query node identifiers, at least one path node in the node path of the matching node that matches the query node identifier; and
        presenting the at least one matching node of the matching document.

2. The method of claim 1, respective nodes specified in a JavaScript Object Notation format.

3. The method of claim 1:
    the query node path specifying a first query node identifier followed by a second query node identifier; and
    identifying the matching documents comprising: identifying at least one matching document having at least one matching node comprising, in the node path of the matching node:
        a first path node matching the first query node identifier; and
        a second path node following the first path node in the node path of the matching node and matching the second query node identifier.

4. The method of claim 1:
the query node path specifying at least query node identifier set comprising at least two alternative query node identifiers; and
identifying the matching documents comprising: identifying at least one matching document having at least one matching node comprising, for respective query node identifier sets, at least one path node in the node path of the matching node that matches at least one of the alternative query node identifiers.

5. The method of claim 1:
at least one node of at least one document further comprising a node value;
the query node path specifying at least one query node value; and
identifying the matching documents comprising: identifying at least one matching document having at least one matching node comprising, for respective query node values of the query, at least one path node in the node path of the matching node that matches the query node identifier and a node value matching the query node value.

6. The method of claim 5:
the query node path specifying a query node value range; and
identifying the matching documents comprising: identifying at least one matching document having at least one matching node comprising, for respective query node values of the query, at least one path node in the node path of the matching node that matches the query node identifier and a node value within the query node value range.

7. The method of claim 1:
the query specifying:
a first query node identifier, and
a second query node identifier having a second node path having a relationship with a first node path of a matching node that matches the first query node identifier; and
identifying the matching documents comprising: identifying at least one matching document having at least one matching node comprising:
a first matching node that matches the first query node identifier; and
a second matching node that matches the second query node identifier and a second node path satisfying the relationship with the first node path of the first matching node.

8. The method of claim 1:
the query comprising: a query selection selecting a query node subset of respective documents; and
identifying the matching documents comprising:
selecting a node subset comprising the nodes of the document within the query node subset; and
applying a remainder of the query to only the node subset.

9. The method of claim 8, the query node subset specified as child nodes descending from a matching node.

10. The method of claim 1:
at least one node of at least one document further comprising a node value;
the query node path requesting at least one node value to be returned for matching nodes; and
presenting the at least one matching document comprising: for respective matching nodes of respective matching documents, presenting the node value of the matching node.

11. The method of claim 1:
the query requesting at least one child node that descends from a matching node; and
presenting the at least one matching document comprising: for respective matching nodes of respective matching documents, presenting at least one child node that descends from the matching node.

12. The method of claim 1:
the query requesting a set of query results; and
the instructions further comprising:
partitioning the query results into query result ranges;
returning the query results within a first query result range; and
upon receiving a request to return a second query result range, return the query results within the second query result range.

13. The method of claim 1:
the query further comprising at least one script to be applied to at least one matching document; and
the instructions further configured to, upon identifying a matching document, applying the script to the matching document.

14. The method of claim 1:
the instructions further configured to, upon receiving a document, index the document in a document index according to, for respective nodes, the node path; and
identifying the at least one matching document comprising: for respective query node identifiers, examine the document index to identify the matching documents having at least one matching node comprising, for respective query node identifiers, at least one query node in the node path of the matching node that matches the query node identifier.

15. The method of claim 14:
at least one node of at least one document further comprising a node value; and
indexing the documents further comprising: indexing the document in a document index according to, for respective nodes, the node path and the node value of the node.

16. The method of claim 14, the document index comprising a reverse index indicating, for respective query node paths, the at least one matching documents having at least one matching node comprising, for respective query node identifiers, at least one query node in the node path of the matching node that matches the query node identifier.

17. The method of claim 14, generating the document index further comprising: for at least two matching nodes matching a query node path through different node paths, consolidating the nodes in the document index.

18. The method of claim 17, consolidating the nodes further comprising:
identifying a similarity degree of the different node paths of the matching nodes; and
consolidating the matching nodes in the document index only if the similarity degree of the different node paths exceeds a similarity degree threshold.

19. A nonvolatile computer-readable storage device comprising instructions that, when executed on a processor of a device, apply queries to a document set comprising at least one document, respective documents comprising at least one node comprising a node name and a node path from a root node of the document, by:
indexing the documents of the document set to generate a reverse index that indicates, for a query node identifier, a matching document subset of the document set, wherein respective documents of the matching document subset comprise at least one matching node comprising at least one path node in the node path of the matching node that matches the query node identifier; and fulfilling a query specifying a query node path comprising at least one query node identifier by:
  using the reverse index, selecting a matching document from the matching document subset;
  selecting, from the matching document, at least one matching node comprising, for respective query node identifiers, at least one path node in the node path of the matching node that matches the query node identifier; and
  presenting the at least one matching node of the matching document.

20. A system of applying, on a device having a processor and a memory, queries to a document set comprising at least one document, respective documents comprising at least one node comprising a node name and a node path from a root node of the document, the system comprising:
  a reverse index indicating, for a query node identifier, a matching document subset of the document set, wherein respective documents of the matching document subset comprise at least one matching node comprising at least one path node in the node path of the matching node that matches the query node identifier;
  a document indexing component comprising instructions stored in the memory that, when executed on the processor, upon receiving a document, index the document in the document index according to, for respective nodes, the node path; and
  a query processing component comprising instructions stored in the memory that, when executed on the processor, fulfills a query specifying a query node path comprising at least one query node identifier by:
    using the reverse index, selecting a matching document from the matching document subset;
    identifying, in the matching document, at least one matching node comprising, for respective query node identifiers, at least one path node in the node path of the matching node that matches the query node identifier; and
    presenting the at least one matching node the matching document.

\* \* \* \* \*